US010961955B2

(12) United States Patent
Ishii et al.

(10) Patent No.: US 10,961,955 B2
(45) Date of Patent: Mar. 30, 2021

(54) AIR INTAKE APPARATUS FOR INTERNAL COMBUSTION ENGINE

(71) Applicant: AISIN SEIKI KABUSHIKI KAISHA, Kariya (JP)

(72) Inventors: Masato Ishii, Kariya (JP); Tomohiro Yamaguchi, Kariya (JP); Hideto Yano, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 16/693,984

(22) Filed: Nov. 25, 2019

(65) Prior Publication Data
US 2020/0248658 A1    Aug. 6, 2020

(30) Foreign Application Priority Data

Feb. 1, 2019 (JP) .............................. JP2019-016675

(51) Int. Cl.
*F02M 31/04* (2006.01)
*F02M 35/10* (2006.01)

(52) U.S. Cl.
CPC .... *F02M 31/045* (2013.01); *F02M 35/10216* (2013.01)

(58) Field of Classification Search
CPC .............. F02M 31/125; F02M 31/045; F02M 35/10216; Y02T 10/126
USPC ........ 123/543, 545, 547, 549, 552, 555, 557
See application file for complete search history.

(56) References Cited

U.S. PATENT DOCUMENTS

| | | | | |
|---|---|---|---|---|
| 4,967,706 A | | 11/1990 | Van et al. | |
| 5,056,495 A | * | 10/1991 | Yamashita | F02M 31/135 123/547 |
| 5,172,673 A | * | 12/1992 | Pelgrim | F02M 31/135 123/549 |
| 5,179,927 A | * | 1/1993 | Henke | F02M 31/135 123/549 |
| 5,284,117 A | * | 2/1994 | Akase | F02D 41/3094 123/445 |
| 5,297,530 A | * | 3/1994 | Kaneko | F02M 31/135 123/549 |

(Continued)

FOREIGN PATENT DOCUMENTS

| | | |
|---|---|---|
| JP | 529784 B2 | 5/1993 |
| JP | 4807232 B2 | 11/2011 |
| JP | 6439431 B2 | 12/2018 |

*Primary Examiner* — Phutthiwat Wongwian
*Assistant Examiner* — Arnold Castro
(74) *Attorney, Agent, or Firm* — Buchanan Ingersoll & Rooney PC (57) ABSTRACT

An air intake apparatus for an internal combustion engine, the air intake apparatus includes: an air intake apparatus main body portion introducing air into a cylinder; a port portion provided integrally with a downstream side end portion of the air intake apparatus main body portion and inserted into an air intake port in a cylinder head; an air intake passage formed inside the air intake apparatus main body portion and the port portion, and through which an air-fuel mixture containing air and fuel flows; an injector provided in the air intake apparatus main body portion and introducing the fuel into the air intake passage; and a heater heating the fuel introduced by the injector. The injector is disposed at a position where the fuel is capable of being injected into the heater.

10 Claims, 6 Drawing Sheets

(56) References Cited

U.S. PATENT DOCUMENTS

| | | | | | |
|---|---|---|---|---|---|
| 5,297,531 | A | * | 3/1994 | Akase | F02M 69/043 |
| | | | | | 123/549 |
| 5,337,723 | A | * | 8/1994 | Yamashita | F02M 31/135 |
| | | | | | 123/549 |
| 5,438,969 | A | * | 8/1995 | Kurr | F02M 31/135 |
| | | | | | 123/549 |
| 5,685,280 | A | * | 11/1997 | Krauss | F02M 31/135 |
| | | | | | 123/549 |
| 5,924,411 | A | * | 7/1999 | Guettle | F02M 27/04 |
| | | | | | 123/549 |
| 2002/0088433 | A1 | * | 7/2002 | Nagano | F02M 69/047 |
| | | | | | 123/431 |
| 2005/0263136 | A1 | * | 12/2005 | Rigney | F02M 53/06 |
| | | | | | 123/470 |

* cited by examiner

SECOND MODIFICATION EXAMPLE

AIR INTAKE APPARATUS FOR INTERNAL COMBUSTION ENGINE

CROSS REFERENCE TO RELATED APPLICATIONS

This application is based on and claims priority under 35 U.S.C. § 119 to Japanese Patent Application 2019-016675, filed on Feb. 1, 2019, the entire contents of which are incorporated herein by reference.

TECHNICAL FIELD

This disclosure relates to an air intake apparatus for an internal combustion engine and, more particularly, to an air intake apparatus for an internal combustion engine provided with a heater.

BACKGROUND DISCUSSION

In the related art, an air intake apparatus for an internal combustion engine provided with a heater is known (see, for example, JP 5-29784B (Reference 1)).

An air intake apparatus for an internal combustion engine provided with a positive temperature coefficient (PTC) tablet (heater) is disclosed in Reference 1. The air intake apparatus for an internal combustion engine disclosed in Reference 1 is provided with an air intake pipe, a plate, a cylindrical surface, and a fuel injector (injector).

The plate of Reference 1 is disposed between the downstream side end surface of the air intake pipe and the outer surface of a cylinder head around an opening in the upstream side end portion of the cylinder head in an intake flow direction. The cylindrical surface of Reference 1 projects along the intake flow direction from the downstream side end portion of the plate in the intake flow direction into an air intake passage of the cylinder head. The fuel injector of Reference 1 is disposed at the downstream side part of the air intake pipe in the intake flow direction. The PTC heater of Reference 1 is disposed outside the cylindrical surface in a direction orthogonal to the intake flow direction.

In the air intake apparatus for an internal combustion engine disclosed in Reference 1, fuel vaporization is promoted by the fuel that has been injected from the fuel injector toward the inner surface of the cylindrical surface being heated by the PTC heater.

However, the air intake apparatus for an internal combustion engine disclosed in Reference 1 is inconvenient in that the fuel injected from the fuel injector intrudes between the plate and the downstream side end surface of the air intake pipe and between the plate and the outer surface of the cylinder head around the opening in the upstream side end portion of the cylinder head. Accordingly, the air intake apparatus for an internal combustion engine disclosed in Reference 1 has problems in that no fuel vaporization by the PTC heater (heater) can be promoted and no sufficient sealability can be ensured with respect to the fuel injected from the fuel injector (injector).

Thus, a need exists for an air intake apparatus for an internal combustion engine which is not susceptible to the drawback mentioned above.

SUMMARY

An air intake apparatus for an internal combustion engine according to an aspect of this disclosure includes an air intake apparatus main body portion introducing air into a cylinder, a port portion provided integrally with a downstream side end portion of the air intake apparatus main body portion and inserted into an air intake port in a cylinder head, an air intake passage formed inside the air intake apparatus main body portion and the port portion, and through which an air-fuel mixture containing air and fuel flows, an injector provided in the air intake apparatus main body portion and introducing fuel into the air intake passage, and a heater heating the fuel introduced by the injector. The injector is disposed at a position where the fuel is capable of being injected into the heater.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment disclosed here will be described with reference to the drawings.

Figure 1:
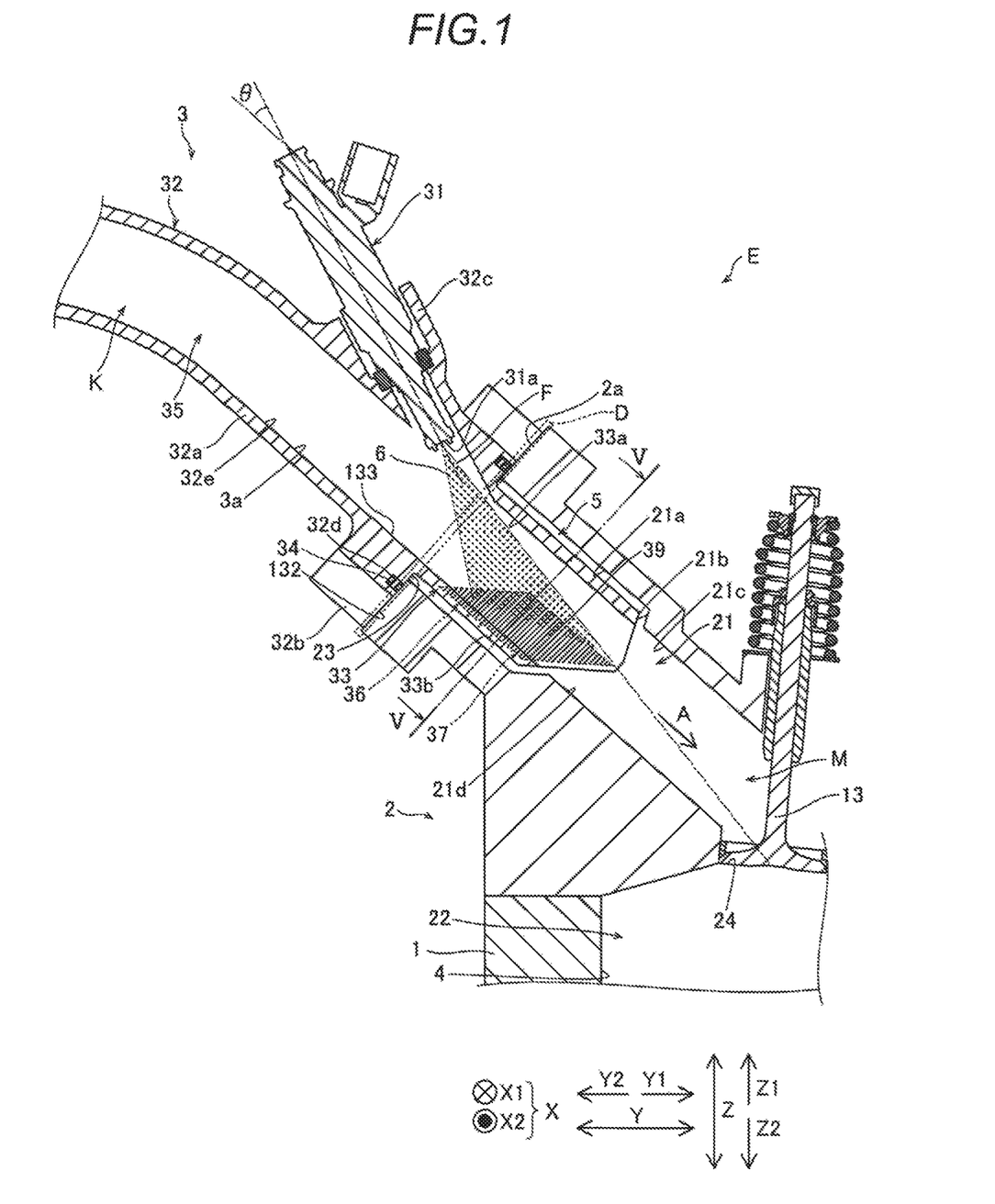
FIG. 1 is a cross-sectional view illustrating a state where an intake manifold according to the present embodiment is attached to a cylinder head.

As illustrated in FIG. 1, an automotive engine E (an example of the "internal combustion engine" in the claims) is provided with a cylinder block 1, a cylinder head 2, and an intake manifold 3 (an example of the "air intake apparatus for an internal combustion engine" in the claims).

The engine E has a structure in which the cylinder head 2 is fixed on the Z1 direction side of the cylinder block 1. The cylinder head 2 has a plurality of air intake ports 21 and a plurality of exhaust ports (not illustrated) communicating with a combustion chamber 22. In addition, the cylinder head 2 is provided with an intake valve 13 and an exhaust valve (not illustrated) opening/closing an opening allowing the combustion chamber 22 and each of the plurality of air intake ports 21 and the plurality of exhaust ports to communicate with each other.

In the present embodiment, upstream and downstream are defined on the basis of the flow of the air flow that flows through the air intake port 21 and is suctioned into the combustion chamber 22 (hereinafter, intake flow direction A). In addition, the direction of extension of a cylinder 4 is defined as the Z direction (vertical direction), one direction in the Z direction is defined as the Z1 direction (upward direction), and the other direction in the Z direction is defined as the Z2 direction (downward direction) in a state where the engine E having a plurality of the cylinders 4 (only one being illustrated in FIG. 1) is mounted in a vehicle (not illustrated). The direction in which the plurality of cylinders 4 are arranged is defined as the X direction (forward-rearward direction), one direction in the X direction is defined as the X1 direction (forward direction), and the other direction in the X direction is defined as the X2 direction (rearward direction). The direction that is orthogonal to the Z direction and the X direction is defined as the Y direction (leftward-rightward direction), one direction in the Y direction is defined as the Y1 direction (rightward direction), and the other direction in the Y direction is defined as the Y2 direction (leftward direction).

The air intake port 21 is provided at a position between an opening 23 on the upstream side in the intake flow direction A and an air intake port 24 on the downstream side in the intake flow direction A. The air intake port 24 allows the air intake port 21 and the combustion chamber 22 to communicate with each other. The air intake port 21 is inclined in the Z2 direction as the air intake port 21 goes in the Y1 direction. The air intake port 21 includes an enlarged portion 21a, a stepped portion 21b, and a reduced portion 21c. At the air intake port 21, the enlarged portion 21a, the stepped portion 21b, and the reduced portion 21c are provided in this order from the upstream side in the intake flow direction A.

A through hole extending along the intake flow direction A constitutes the enlarged portion 21a. The enlarged portion 21a is provided in a substantially rectangular shape (see FIG. 5) when viewed from the upstream side in the intake flow direction A. In the intake flow direction A, the enlarged portion 21a is provided up to the middle part of the air intake port 21. In the direction that is orthogonal to the intake flow direction A, the enlarged portion 21a is larger in length than the reduced portion 21c. In the intake flow direction A, the maximum length of the enlarged portion 21a is smaller than the maximum length of the reduced portion 21c.

The stepped portion 21b interconnects the enlarged portion 21a and the reduced portion 21c in the intake flow direction A. In other words, in the intake flow direction A, the upstream side end portion of the stepped portion 21b is provided integrally with the downstream side end portion of the enlarged portion 21a. In the intake flow direction A, the downstream side end portion of the stepped portion 21b is provided integrally with the upstream side end portion of the reduced portion 21c. The stepped portion 21b has a tapered shape in which the downstream side in the intake flow direction A becomes narrow. In other words, the stepped portion 21b is inclined to the middle portion side (inner side) of the air intake port 21 in the direction that is orthogonal to the intake flow direction A as the stepped portion 21b goes in the intake flow direction A.

A through hole extending along the intake flow direction A constitutes the reduced portion 21c. The reduced portion 21c is provided in a rectangular shape (see FIG. 5) when viewed from the upstream side in the intake flow direction A. In the intake flow direction A, the reduced portion 21c is provided from the middle part of the air intake port 21 to the downstream side end portion of the air intake port 21.

Intake Manifold

As illustrated in FIG. 1, the engine E is configured to supply an air-fuel mixture M containing air K and fuel F into the combustion chamber 22 of the cylinder 4 by means of the intake manifold 3. Specifically, the intake manifold 3 includes an injector 31, an air intake apparatus main body portion 32, a port portion 33, a gasket 34 (an example of the "seal member" in the claims), an air intake passage 35, an embedded recessed portion 36, a heater 37, a heat insulating member 38 (see FIG. 5), and a heater protection film 39.

Injector

The injector 31 is configured to inject the fuel F in the form of fog into the air K flowing toward the combustion chamber 22. The injector 31 is provided in the air intake apparatus main body portion 32 and is configured to introduce the fuel F into the air intake passage 35.

Specifically, the injector 31 injects the fuel F such that the fuel F diffuses to the periphery as the fuel F goes toward the combustion chamber 22 in the intake flow direction A. Here, the injector 31 diffuses the fuel F in the form of an injection region 6. In other words, the injection region 6 expands in the direction that is orthogonal to (intersects with) the injection direction of the fuel F as the injection region 6 goes downstream in the injection direction of the fuel F.

In addition, the injector 31 is inclined to the Z1 direction (upward direction) side with respect to the direction in which the air intake port 21 extends. In other words, the injector 31 is inclined by a predetermined angle θ with respect to the direction in which the air intake port 21 extends.

The predetermined angle θ of the injector 31 is an angle at which at least a part of the heater 37 can be disposed within the range of the downstream end of the injection region 6. Further, the predetermined angle θ of the injector 31 is an angle at which a part of the air intake port 24 can be disposed within the range of the downstream end of the injection region 6. The part of the heater 37 indicates a part of the surface of the heater 37 that is on the air intake passage 35 side in the direction orthogonal to the intake flow direction A. In addition, the part of the air intake port 24 indicates the part between the middle position of the air intake port 24 and the end portion of the air intake port 24 that is on the intake manifold 3 side in the direction orthogonal to the intake flow direction A.

The injector 31 is disposed at a position where the fuel F can be injected into the heater 37. In other words, the injector 31 is disposed on the downstream side of the air intake apparatus main body portion 32 in the intake flow direction A in a state of being inclined by the predetermined angle θ. Here, a distal end portion 31a of the injector 31 is disposed upstream of a boundary part D (described later) between the air intake apparatus main body portion 32 and the port portion 33 in the intake flow direction A. Specifically, in the intake flow direction A, the distal end portion 31a of the injector 31 is disposed upstream of an outer surface 2a of the cylinder head 2 around the opening 23 of the air intake port 21. In other words, in the intake flow direction A, the distal end portion 31a of the injector 31 is disposed upstream of the gasket 34.

A part of the distal end portion 31a of the injector 31 is disposed in the air intake passage 35. Specifically, the part of the distal end portion 31a of the injector 31 that is on the cylinder block 1 side is disposed in the air intake passage 35 in the direction orthogonal to the intake flow direction A.

The fuel F is, for example, gasoline, gas fuel, or ethanol. In this manner, the engine E is a port injection engine in which the fuel F is injected into the air intake port 21.

Air Intake Apparatus Main Body Portion and Port Portion

As illustrated in FIGS. 1 to 4, the air intake apparatus main body portion 32 and the port portion 33 are provided in each of the plurality of air intake ports 21 respectively supplying the air-fuel mixture M to the plurality of cylinders 4 in the engine E. Accordingly, only the configurations of the air intake apparatus main body portion 32 and the port portion 33 that are disposed in the X2 direction side end portion among the plurality of cylinders 4 will be described below. Likewise, only those disposed in the X2 direction side end portion will be described with regard to the gasket 34, the air intake passage 35, the embedded recessed portion 36, the heater 37, the heat insulating member 38 (see FIG. 5), and the heater protection film 39.

As illustrated in FIG. 1, the air intake apparatus main body portion 32 is configured to introduce the air K into the combustion chamber 22.

Specifically, the air intake apparatus main body portion 32 is formed of resin. The air intake apparatus main body portion 32 has a surge tank (not illustrated), an air intake pipe portion 32a, a flange portion 32b, an injector attaching portion 32c, and a recessed portion 32d.

The surge tank temporarily stores the air K. The surge tank is disposed in the upstream side end portion in the intake flow direction A in the intake manifold 3. The air intake pipe portion 32a allows the air K to flow along the passage that is formed in the air intake pipe portion 32a. The air intake pipe portion 32a is disposed downstream of the surge tank. The air intake pipe portion 32a interconnects the surge tank and the flange portion 32b.

The flange portion 32b is provided for inserting a fastener (not illustrated) fixing the intake manifold 3 to the cylinder head 2. The intake manifold 3 is fixed to the cylinder head 2 via the flange portion 32b.

The flange portion 32b has a flange shape. The flange portion 32b is disposed so as to face the outer surface 2a of the cylinder head 2 and is provided integrally with the end portion of the port portion 33 that is on the air intake apparatus main body portion 32 side. In other words, the flange portion 32b has a facing surface 132 facing the outer surface 2a of the cylinder head 2. In the direction orthogonal to the intake flow direction A, the inner side end portion of the facing surface 132 is integrally connected to the port portion 33.

Figure 2:
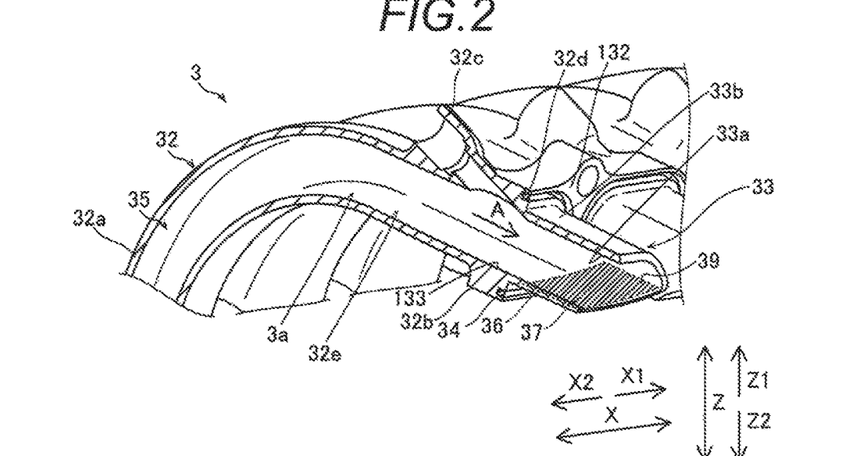
FIG. 2 is a perspective cross-sectional view of the downstream side part of the intake manifold according to the present embodiment.

As illustrated in FIGS. 1 and 2, the injector attaching portion 32c is provided so that the injector 31 is attached to the air intake apparatus main body portion 32. The injector attaching portion 32c has a space into which the injector 31 is inserted. The space of the injector attaching portion 32c extends in a direction inclined by the predetermined angle θ with respect to the direction of extension of the air intake port 21 so that the injector 31 is inclined by the predetermined angle θ and attached to the air intake apparatus main body portion 32.

The injector attaching portion 32c is provided at the Z1 direction side (upper side) part of the air intake apparatus main body portion 32. The injector attaching portion 32c is provided in the downstream side end portion of the air intake apparatus main body portion 32 in the intake flow direction A. In other words, the injector attaching portion 32c is provided from the downstream side part of the air intake pipe portion 32a to the downstream side end portion of the flange portion 32b in the intake flow direction A. The injector attaching portion 32c projects in the direction inclined by the predetermined angle θ from the Z1 direction side (upper side) part of the air intake apparatus main body portion 32.

Figure 3:
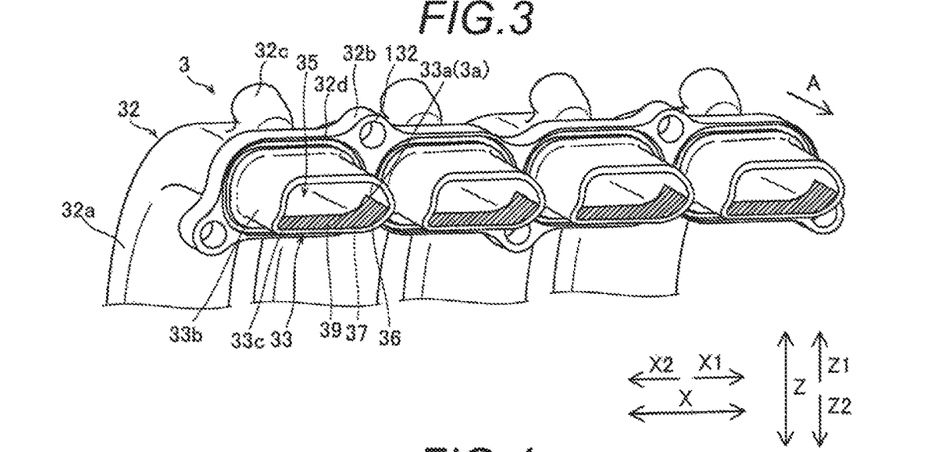
FIG. 3 is a perspective view of the intake manifold according to the present embodiment as viewed from the upstream side in an intake flow direction.

As illustrated in FIGS. 1 and 3, the recessed portion 32d is configured such that the gasket 34 is fitted. Specifically, the recessed portion 32d is the end surface of the flange portion 32b on the downstream side in the intake flow direction A that is recessed in the direction opposite to the intake flow direction A. The recessed portion 32d is formed in a circumferential shape so as to surround the upstream side end portion of the port portion 33 in the intake flow direction A.

As illustrated in FIG. 1, the port portion 33 constitutes a heat insulating port structure insulating heat from the cylinder head 2. In other words, the port portion 33 has the shape of a resin tube suppressing heat transfer from the cylinder head 2 with respect to the air K supplied from the intake manifold 3 to the combustion chamber 22. The port portion 33 is a tubular part inserted into the air intake port 21 from the opening 23 on the upstream side of the air intake port 21.

The port portion 33 is configured to have heat resistance against heat transferred from the cylinder head 2 and heat from the combustion chamber 22. Specifically, the port portion 33 is formed of a non-foamed resin material. For example, the port portion 33 is formed of a heat-resistant polyamide 6. As a result, it is possible to suppress a change in physical properties (such as dissolution) with respect to heat transferred from the cylinder head 2 and heat from the combustion chamber 22 in the range where the port portion 33 is disposed.

The port portion 33 of the present embodiment is integrally provided in the downstream side end portion of the air intake apparatus main body portion 32 and is inserted in the air intake port 21 in the cylinder head 2. In other words, in the intake flow direction A, the upstream side end portion of the port portion 33 and the downstream side end of the air intake apparatus main body portion 32 are integrally provided. Specifically, the port portion 33 integrally projects along the intake flow direction A from the downstream side end portion of the air intake apparatus main body portion 32 in the intake flow direction A (downstream side end portion of the flange portion 32b). In addition, around the central axis line that extends in the intake flow direction A, the upstream side end portion of the port portion 33 and the downstream side end of the air intake apparatus main body portion 32 are integrally provided over the entire circumferential direction.

Here, the connection part between the upstream side end portion of the port portion 33 and the downstream side end of the air intake apparatus main body portion 32 is the boundary part D. The boundary part D is also a contact part between the outer surface 2a of the cylinder head 2 and the facing surface 132 of the flange portion 32b. In the Y direction, a part of the boundary part D is disposed outside the outer surface of the cylinder block 1. In other words, in the Y direction, the maximum distance between the boundary part D and the combustion chamber 22 is larger than the distance between the outer surface of the cylinder block 1 and the combustion chamber 22.

The port portion 33 faces an inner surface 21d of the air intake port 21. Specifically, the port portion 33 has a length at which insertion is possible from the upstream side end portion of the air intake port 21 to the vicinity of the middle position of the air intake port 21 in the intake flow direction A. In other words, in the intake flow direction A, the projecting distal end portion of the port portion 33 is disposed at the upstream side part of the reduced portion 21c of the air intake port 21 (upstream side part between the middle position and the downstream end position of the air intake port 21). Accordingly, the port portion 33 is disposed between the inner surface 21d of the air intake port 21 and the air intake passage 35 from the upstream side end portion of the air intake port 21 to the upstream side part of the reduced portion 21c of the air intake port 21. As a result, it is possible to suppress heat transfer from the cylinder head 2 to the air K flowing through the air intake passage 35 from the upstream side end portion of the air intake port 21 to the upstream side part of the reduced portion 21c of the air intake port 21.

In the cross section in the intake flow direction A, the port portion 33 has a shape along the inner surface 21d of the air intake port 21. In other words, in the cross section in the intake flow direction A, the port portion 33 has a shape along the enlarged portion 21a and stepped portion 21b parts of the inner surface 21d of the air intake port 21.

Figure 4:
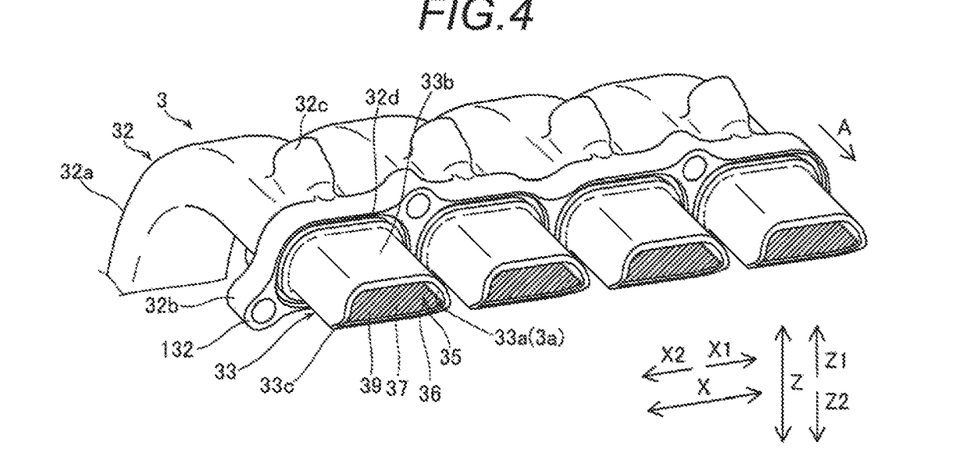
FIG. 4 is a perspective view of the intake manifold according to the present embodiment as viewed from the Z1 direction side.

Specifically, as illustrated in FIGS. 3 and 4, the port portion 33 has a tapered shape extending along the intake flow direction A. In other words, the part of the port portion 33 that corresponds to the enlarged portion 21a is provided in a straight line along the intake flow direction A. The part of the port portion 33 that corresponds to the stepped portion 21b has a tapered shape.

Specifically, at the part of the port portion 33 that corresponds to the stepped portion 21b, each of the parts on both sides in the X direction is formed in a tapered shape. In other words, each of the parts on both sides in the X direction at the part of the port portion 33 that corresponds to the stepped portion 21b is inclined to the middle position side of the air intake passage 35 in the Z direction as each of the parts goes in the intake flow direction A. Here, at the part of the port portion 33 that corresponds to the stepped portion 21b, the parts on both sides in the X direction are respectively disposed downstream of the parts on both sides in the Z direction in the intake flow direction A.

Figure 5:
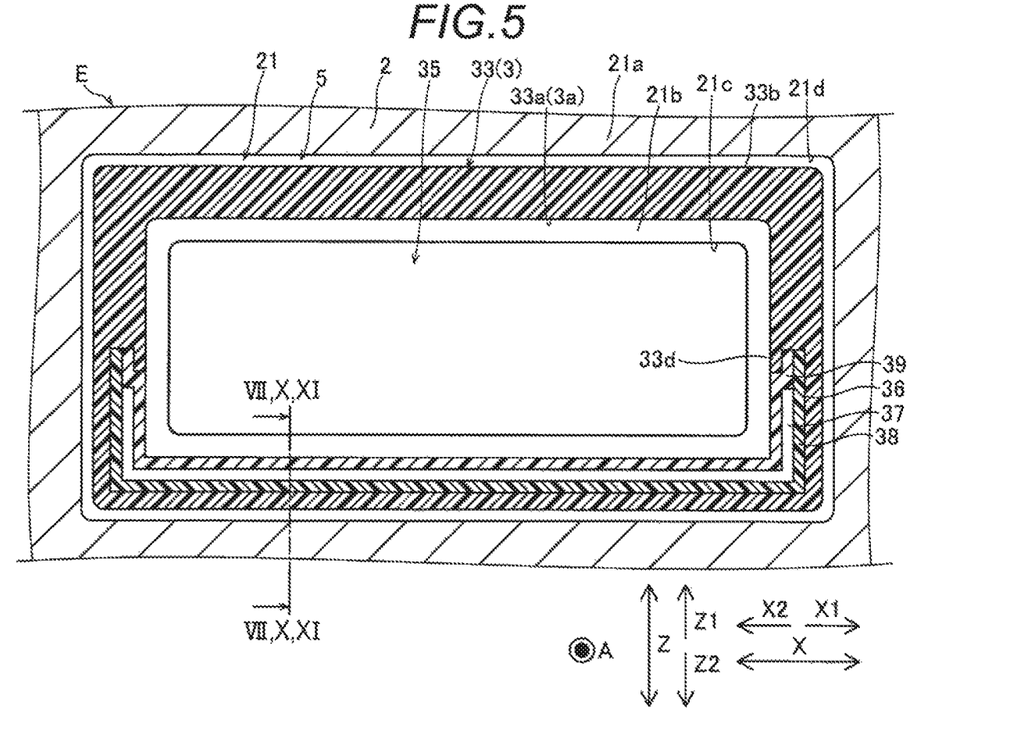
FIG. 5 is a cross-sectional view taken along line V-V in FIG. 1.

In addition, as illustrated in FIG. 5, an air insulation layer 5 is formed between an outer surface 33b of the port portion 33 and the inner surface 21d of the air intake port 21 in the direction orthogonal to the intake flow direction A. In other words, the air insulation layer 5 is an air layer formed between the outer surface 33b of the port portion 33 and the inner surface 21d of the air intake port 21 in a state where the port portion 33 is inserted in the air intake port 21. Here, in the direction orthogonal to the intake flow direction A, the cross-sectional shape of the port portion 33 is formed so as to be smaller than the cross-sectional shape of the air intake port 21 so that the air insulation layer 5 is formed.

As illustrated in FIG. 1, the interval between the outer surface 33b of the port portion 33 and the inner surface 21d of the air intake port 21 is substantially constant. In other words, in the direction orthogonal to the intake flow direction A, the interval between the outer surface 33b of the port portion 33 and the enlarged portion 21a part of the inner surface 21d of the air intake port 21 is substantially constant. In addition, in the direction orthogonal to the intake flow direction A, the interval between the outer surface 33b of the port portion 33 and the stepped portion 21b part of the inner surface 21d of the air intake port 21 is substantially constant. In this manner, the outer surface 33b of the port portion 33 is disposed at a position offset to the inner side in the direction orthogonal to the intake flow direction A.

In addition, the port portion 33 is configured such that the air K smoothly flows out into the air intake port 21. Specifically, an inner surface 33a of the port portion 33 is provided so as to be substantially flush with the inner surface 21d of the air intake port 21 in the intake flow direction A.

Gasket

The gasket 34 is configured to suppress intrusion of foreign matter such as water into the air intake port 21. Specifically, the gasket 34 is formed of an elastic member. In other words, the gasket 34 is formed of heat-resistant nitrile rubber, hydrogenated nitrile rubber, silicone rubber, fluororubber, and the like.

The gasket 34 is enhanced in terms of sealability by being pinched and compressed between the flange portion 32b of the air intake apparatus main body portion 32 and the outer surface 2a of the cylinder head 2. In other words, the gasket 34 is disposed between the flange portion 32b of the air intake apparatus main body portion 32 and the outer surface 2a of the cylinder head 2. Here, the gasket 34 is fitted in the recessed portion 32d formed in the flange portion 32b.

Figure 6A:
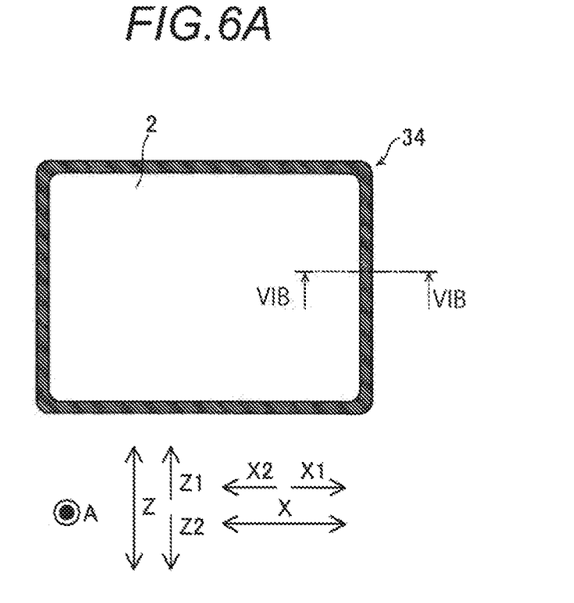
FIG. 6A is a front view of a seal member.

In addition, as illustrated in FIGS. 3 and 6A, the gasket 34 is provided so as to surround the upstream side end portion of the port portion 33 in the intake flow direction A. The gasket 34 is formed in a circumferential shape. In other words, the gasket 34 has a shape along the circumferential direction around the central axis line extending in the intake flow direction A. The gasket 34 has a substantially rectangular shape when viewed from the downstream side in the intake flow direction A.

Figure 6B:
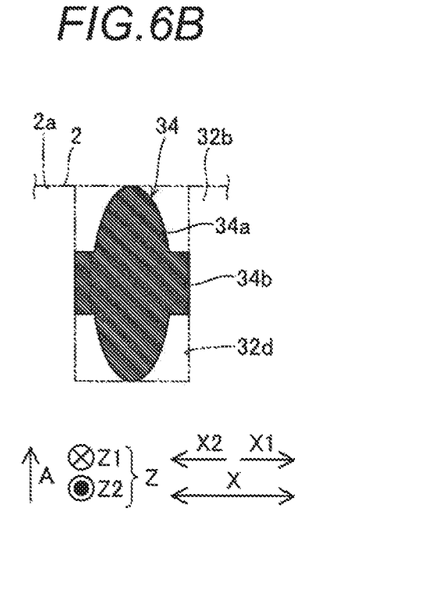
FIG. 6B is a cross-sectional view taken along line VIB-VIB in FIG. 6A.

In addition, as illustrated in FIG. 6B, the cross-sectional shape of the gasket 34 has a substantially elliptical shape extending along the intake flow direction A in the direction that is along the intake flow direction A. Specifically, the gasket 34 has a compression portion 34a and a rib portion 34b.

The compression portion 34a is compressed by each of the flange portion 32b of the air intake apparatus main body portion 32 and the outer surface 2a of the cylinder head 2. In the intake flow direction A, the upstream side end portion of the compression portion 34a is in contact with the downstream side end surface of the flange portion 32b of the air intake apparatus main body portion 32. In the intake flow direction A, the downstream side end portion of the compression portion 34a is in contact with the outer surface 2a of the cylinder head 2.

The rib portion 34b holds the posture of the gasket 34 fitted in the recessed portion 32d. The rib portion 34b is in contact with each of the pair of inner side surfaces of the recessed portion 32d that face each other in the X direction. In other words, the rib portion 34b projects in the X1 direction from the side surface of the compression portion 34a that is on the X1 direction side. In addition, the rib portion 34b projects in the X2 direction from the side surface of the compression portion 34a that is on the X2 direction side. In the intake flow direction A, the rib portion 34b is disposed at the middle part of the compression portion 34a.

Air Intake Passage

As illustrated in FIG. 1, the air intake passage 35 is formed inside the air intake apparatus main body portion 32 and the port portion 33 and is configured so as to allow the air-fuel mixture M to flow. In other words, the air intake passage 35 is the internal space of the air intake apparatus main body portion 32 and the port portion 33. Specifically, the air intake passage 35 passes through the air intake apparatus main body portion 32 and the port portion 33 in the intake flow direction A. The air intake passage 35 has a flat shape (see FIG. 5) in which the air intake passage 35 is shorter in the Z direction than in the X direction when viewed from the downstream side in the intake flow direction A.

Embedded Recessed Portion

The embedded recessed portion 36 is an inner surface 3a of the intake manifold 3 that is recessed in the direction orthogonal to the intake flow direction A. Specifically, the embedded recessed portion 36 is the inner surface 33a of the port portion 33 that is recessed to the outer side in the direction orthogonal to the intake flow direction A. The embedded recessed portion 36 is disposed at the part of the port portion 33 that corresponds to the injection region 6 of the fuel F injected from the injector 31.

As illustrated in FIG. 5, in the direction orthogonal to the intake flow direction A, the cross-sectional shape of the embedded recessed portion 36 has a substantially U shape. In the direction orthogonal to the intake flow direction A, the embedded recessed portion 36 is formed in the lower portion of the intake manifold 3 (at the part that is closer to the Z1 direction side than the middle part in the Z direction).

Here, the heater 37 is disposed in the embedded recessed portion 36. In addition, in the direction orthogonal to the intake flow direction A, the heat insulating member 38 is disposed outside the embedded recessed portion 36 and the heater 37 is stacked inside the heat insulating member 38. Specifically, a layered structure formed by the heater protection film 39, the heater 37, and the heat insulating member 38 is embedded in the embedded recessed portion 36.

Here, the heater protection film 39, the heater 37, and the heat insulating member 38 are embedded in the embedded recessed portion 36 in a state where the heater protection film 39, the heater 37, and the heat insulating member 38 are stacked in this order in the direction orthogonal to the intake flow direction A.

Heater

Figure 7:
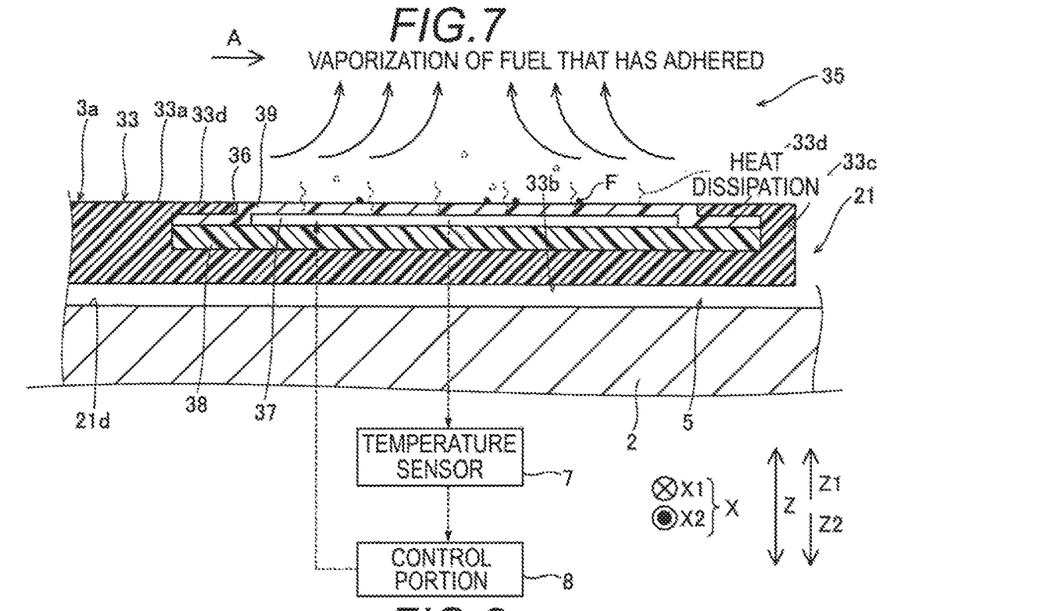
FIG. 7 is a schematic diagram illustrating a cross section taken along line VII-VII in FIG. 5, a temperature sensor, and a control portion.

As illustrated in FIG. 7, the heater 37 is configured to heat the fuel F introduced by the injector 31. Specifically, the heater 37 is configured to vaporize the fuel F that has adhered without vaporization to the inner surface 3a of the intake manifold 3 when, for example, the engine is cold immediately after the start of the engine (before a three-way catalyst disposed in an exhaust pipe is warmed up). As a result, the air-fuel ratio (A/F) at the time of a cold start is stabilized, the amount of fuel injection can be controlled so as to be small, and it is possible to suppress an excessive amount of the fuel F being supplied into the combustion chamber 22.

Specifically, the heater 37 includes a heat generating element having high temperature rise characteristics. In other words, it is preferable that the heater 37 has the high temperature rise characteristics of reaching a predetermined temperature (approximately 70° C.) within a very short time (approximately 3 seconds to approximately 5 seconds) from the time of the initial operation of the engine. Accordingly, the heater 37 has, for example, carbon graphite or a carbon nanotube as a heat generating element having carbon as a main component. Here, it is more preferable that the heater 37 is formed by a sheet-shaped carbon nanotube being pasted to the heater protection film 39 or a liquid carbon nanotube being applied to the heater protection film 39.

As illustrated in FIGS. 1 and 7, the heater 37 is disposed at a position where heat can be directly applied to the fuel F that has adhered without vaporization to the inner surface 3a of the intake manifold 3. In other words, at least a part of the heater 37 is disposed at the part of the port portion 33 that corresponds to the injection region 6 of the fuel F injected from the injector 31.

Specifically, the heater 37 is disposed in the port portion 33 in the intake flow direction A. Here, the heater 37 is disposed between the distal end portion 31a of the injector 31 and the downstream side end portion of the port portion 33 in the intake flow direction A. In other words, the heater 37 is provided in the vicinity of the distal end portion of the intake manifold 3.

As illustrated in FIGS. 1 and 5, the heater 37 is configured to reliably apply heat to the fuel F that diffuses and adheres to the inner surface 33a of the port portion 33. Specifically, in the direction orthogonal to the intake flow direction A, the cross-sectional shape of the heater 37 has a substantially U shape. In the direction orthogonal to the intake flow direction A, the heater 37 is formed in the lower portion of the intake manifold 3 (at the part that is closer to the Z1 direction side than the middle part in the Z direction). The heater 37 is a planar heater that is along the shape of the embedded recessed portion 36 in the direction orthogonal to the intake flow direction A.

The heater 37 is provided on the inner surface 33a side of the port portion 33. In other words, the heater 37 is disposed at a position adjacent to the air intake passage 35 via the heater protection film 39 in the direction orthogonal to the intake flow direction A.

Heat Insulating Member

As illustrated in FIG. 7, the heat insulating member 38 is configured to function as a heat insulating material suppressing heat transfer from the heater 37. Specifically, the heat insulating member 38 has a foamed resin material. In other words, the heat insulating member 38 is formed by foam molding being performed on a polyamide. In this manner, the heat insulating member 38 is improved in terms of heat insulation performance by air bubbles in which gas is sealed being formed. It is preferable that the heat transfer coefficient of the heat insulating member 38 is approximately 10% or less of the heat transfer coefficient of the heater protection film 39.

The heat insulating member 38 is disposed inside the intake manifold 3. Specifically, the heat insulating member 38 is embedded in the embedded recessed portion 36. Here, the heat insulating member 38 is provided in a state of being in direct contact with the inner surface 3a of the intake manifold 3.

As illustrated in FIG. 5, the heat insulating member 38 has a substantially U shape when viewed from the downstream side in the intake flow direction A. In the direction orthogonal to the intake flow direction A, the heater 37 is formed in the lower portion of the intake manifold 3 (at the part that is closer to the Z1 direction side than the middle part in the Z direction).

Heater Protection Film

The heater protection film 39 is configured to protect the heater 37 so that the fuel F injected from the injector 31 does not adhere to the heater 37. Specifically, the heater protection film 39 covers the heater 37 from the air intake passage 35 side. In other words, the heater protection film 39 is provided over the entire cross-sectional shape of the heater 37 that is orthogonal to the intake flow direction A. In this manner, the heater protection film 39 is provided along the inner surface of the heater 37.

The heater protection film 39 is formed of a material that is easy to fit along the inner surface of the heater 37. Specifically, a resin film constitutes the heater protection film 39. Here, it is preferable that the heater protection film 39 is a resin material having heat resistance, oil resistance, and chemical resistance. For example, polyimide or the like is preferably used as the heater protection film 39.

The heater protection film 39 is configured to easily transfer heat from the heater 37. Specifically, the heater protection film 39 is formed of a thin resin film so as not to hinder heat radiation from the heater 37 toward the air intake passage 35 side. In other words, it is preferable that the heater protection film 39 is, for example, a thin resin film having a thickness of approximately 0.125 [mm].

In addition, the heater protection film 39 is less heat-insulating than the heat insulating member 38. Specifically, it is preferable that the heat transfer coefficient of the heater protection film 39 is approximately 10 times or more the heat transfer coefficient of the heat insulating member 38.

Layered Structure

As illustrated in FIG. 7, a four-layer structure constitutes the internal structure of the embedded recessed portion 36 part of the intake manifold 3. Specifically, the heater protection film 39, the heater 37, the heat insulating member 38, and the intake manifold 3 are stacked in this order in the direction orthogonal to the intake flow direction A. In other words, a layered structure formed by the heater protection film 39, the heater 37, the heat insulating member 38, and the intake manifold 3 is formed at a part of the intake manifold 3.

Specifically, the heat insulating member 38 is stacked outside the heater 37 in the direction orthogonal to the intake flow direction A and is configured to insulate heat from the heater 37. In other words, the heat insulating member 38 is in contact with the heater 37. The heater protection film 39 is stacked inside the heater 37 in the direction orthogonal to the intake flow direction A. In other words, the heater protection film 39 is in contact with the heater 37.

The intake manifold 3 is configured to enclose the peripheral edge portion of the heat insulating member 38. In other words, the intake manifold 3 is configured to thermally protect the heat insulating member 38 by being more heat-resistant than the heat insulating member 38.

Specifically, the port portion 33 has a flange portion 33c, which projects toward the center of a cross-sectional portion of the air intake passage 35, in the downstream side end portion of the port portion 33 in the intake flow direction A. In other words, the heat insulating member 38 is covered with the flange portion 33c from the side of the direction opposite to the intake flow direction A. Here, the flange portion 33c forms the end portion of the embedded recessed portion 36 in the intake flow direction A. In this manner, the intake manifold 3 thermally blocks the heat insulating member 38 from the high heat that is released from the combustion chamber 22 (see FIG. 1) by means of the flange portion 33c.

In addition, the intake manifold 3 is configured to suppress peeling of the heater protection film 39 provided with the heater 37 from the heat insulating member 38. Specifically, the port portion 33 has a projecting pressing portion 33d pressing the heater protection film 39 provided with the heater 37 from the direction orthogonal to the intake flow direction A. The projecting pressing portion 33d presses the peripheral edge portion of the surface of the heater protection film 39 provided with the heater 37 that is on the air intake passage 35 side. In other words, the projecting pressing portion 33d projects toward the center of the embedded recessed portion 36 from the peripheral edge portion of the embedded recessed portion 36 that is on the intake flow direction A side. The projecting pressing portion 33d projects toward the center of the embedded recessed portion 36 from the peripheral edge portion of the embedded recessed portion 36 that is on the side opposite to the intake flow direction A.

ECU

As illustrated in FIG. 7, the engine E is provided with a temperature sensor 7 measuring the temperature of the heater 37 and a control portion 8 controlling the temperature of the heater 37 on the basis of the temperature measured by the temperature sensor 7.

An engine control unit (ECU) including a central processing unit (CPU, not illustrated) as a control circuit and a memory (not illustrated) as a storage medium constitutes the control portion 8.

The control portion 8 controls each portion of the engine E by the CPU executing an engine control program stored in the memory. In addition, the control portion 8 is configured to grasp information such as a first predetermined condition, a second predetermined condition, and the temperature of the heater 37.

Here, the first predetermined condition is a condition at a time when the heater 37 is preheated (residual heat) before the initial operation of the engine and is, for example, a condition including at least one of a user approaching the vehicle with a wireless key, door unlocking by the user, the user taking his or her seat, and brake pedal depression by the user. In addition, the second predetermined condition is a condition at a time when the heater 37 is preheated (residual heat) before the engine is restarted and is, for example, a condition including at least one of the temperature of outside air, the temperature of the three-way catalyst disposed in the exhaust pipe, the temperature of the inner wall surface of the air intake port 21, and the temperature of the cooling water of the engine E.

The control portion 8 is configured to prevent excessive heat generation of the heater 37 on the basis of the temperature measured by the temperature sensor 7 and in accordance with the engine control program. In addition, the control portion 8 is configured to reliably vaporize the fuel F that has adhered without vaporization to the inner surface 33a of the port portion 33 by means of the heater 37, on the basis of the first predetermined condition and the second predetermined condition, and in accordance with the engine control program.

An optimal sensor as the temperature sensor 7 is selected from a thermistor, a thermocouple, a side temperature resistor, and the like. Preferably used as the temperature sensor 7 is a sensor having a quick response to a change in temperature.

Heater Heating Treatment at Time of Initial Engine Operation

Figure 8:
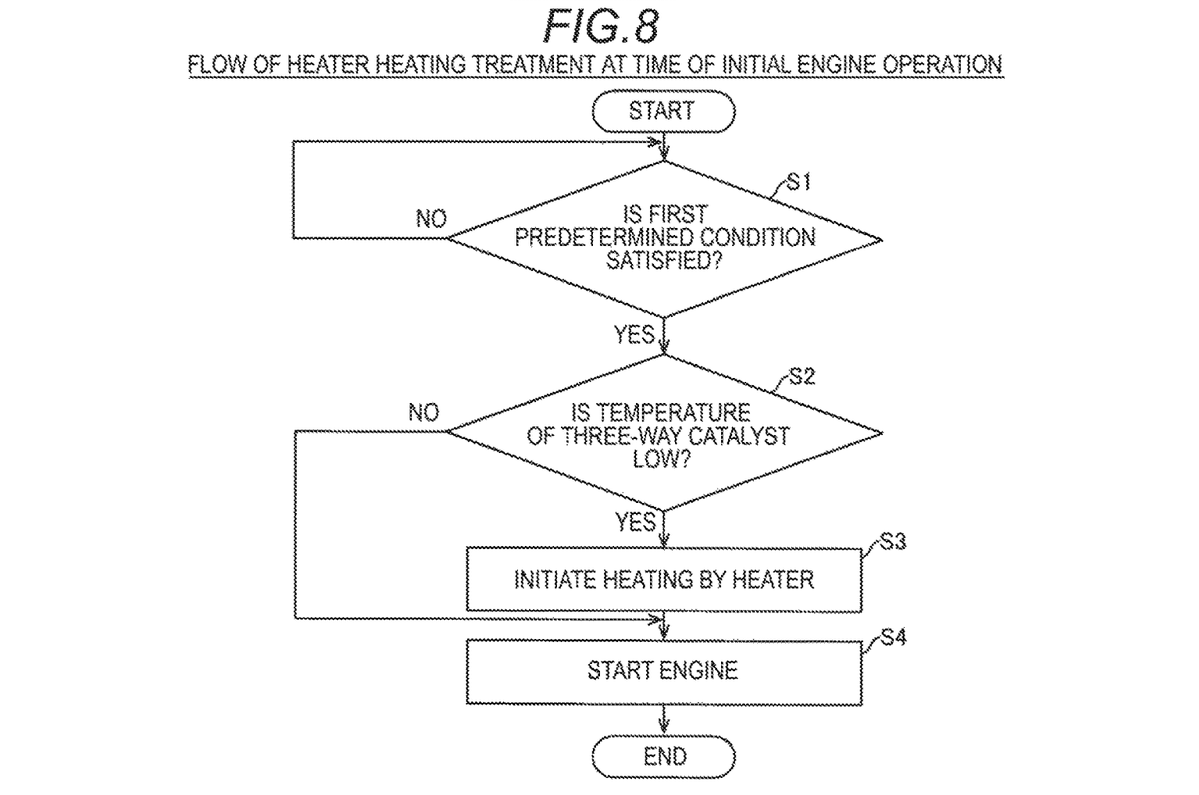
FIG. 8 is a flowchart illustrating the heater heating treatment at a time of the initial operation of an engine that is performed in the control portion of the engine provided with the intake manifold according to the present embodiment.

The heater heating treatment at a time of the initial operation of the engine that is included in the engine control processing by the control portion 8 will be described below with reference to FIG. 8. The heater heating treatment at the time of the initial engine operation is to initiate the heating of the heater 37 in advance before the initial engine operation.

In Step S1, the control portion 8 determines whether or not the first predetermined condition (such as the door unlocking by the user) has been satisfied. The control portion 8 proceeds to Step S2 in a case where the first predetermined condition is satisfied and returns to Step S1 in a case where the first predetermined condition is not satisfied. In Step S2, the control portion 8 determines whether or not the temperature of the three-way catalyst is a low temperature lower than a predetermined temperature. The control portion 8 proceeds to Step S3 in a case where the temperature of the three-way catalyst is low and the control portion 8 proceeds to Step S4 and starts the engine E and the heater heating treatment at the time of the initial engine operation is terminated in a case where the temperature of the three-way catalyst is not low (in a case where the temperature of the three-way catalyst is high).

After the heating by the heater 37 is initiated in Step S3, the control portion 8 proceeds to Step S4 and starts the engine E. After proceeding to Step S4, the control portion 8 terminates the heater heating treatment at the time of the initial engine operation.

In the control portion 8, the heating of the heater 37 is stopped when the heater heating treatment at the time of the initial engine operation is terminated. Here, the timing when the heating of the heater 37 is stopped may be when the three-way catalyst is completely warmed up, a predetermined time (approximately 20 seconds to approximately 30 seconds) after the start of the engine, or the like.

Heater Heating Treatment at Time of Engine Restart

Figure 9:
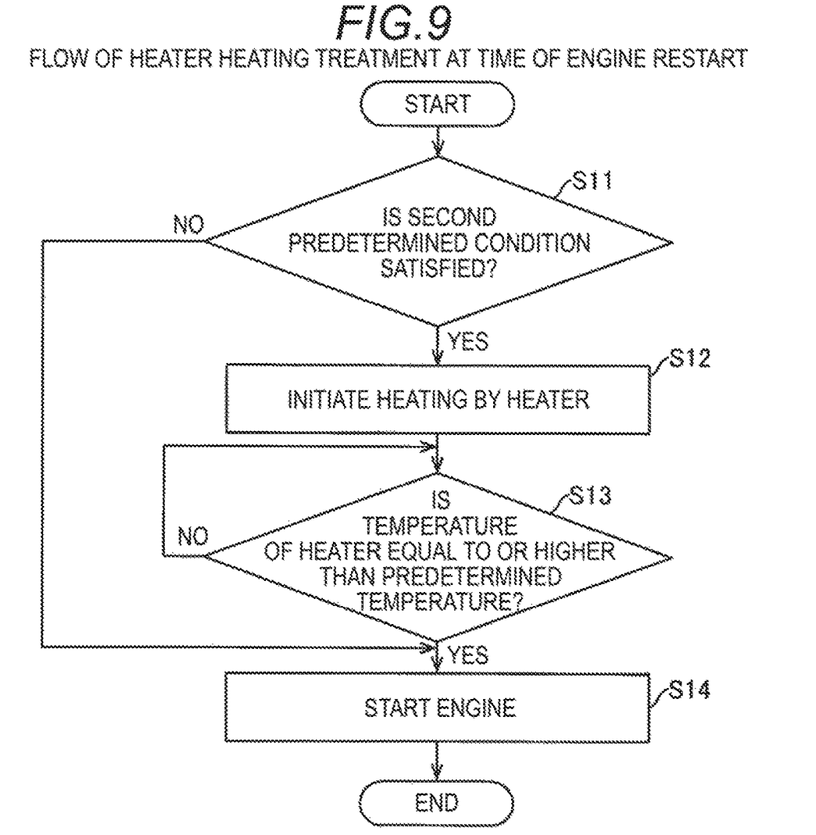
FIG. 9 is a flowchart illustrating the heater heating treatment at a time of the restart of the engine that is performed in the control portion of the engine provided with the intake manifold according to the present embodiment.

The heater heating treatment at a time of engine restart that is included in the engine control processing by the control portion 8 will be described below with reference to FIG. 9. The heater heating treatment at the time of the engine restart is to initiate the heating of the heater 37 in advance before the engine is restarted.

In Step S11, the control portion 8 determines whether or not the second predetermined condition (such as the temperature of the three-way catalyst being low) has been satisfied. The control portion 8 proceeds to Step S12 in a case where the second predetermined condition is satisfied and the control portion 8 proceeds to Step S14 and starts the engine E and the heater heating treatment at the time of the engine restart is terminated in a case where the second predetermined condition is not satisfied.

In Step S12, the control portion 8 initiates the heating by the heater 37. In Step S13, the control portion 8 determines whether or not the temperature of the heater 37 is equal to or higher than a predetermined temperature. The control portion 8 proceeds to Step S14 in a case where the temperature of the heater 37 is equal to or higher than the predetermined temperature and returns to Step S13 in a case where the temperature of the heater 37 is lower than the predetermined temperature.

After the engine E is started in Step S14, the control portion 8 terminates the heater heating treatment at the time of the engine restart.

In the control portion 8, the heating of the heater 37 is stopped when the heater heating treatment at the time of the engine restart is terminated. Here, the timing when the heating of the heater 37 is stopped may be when the three-way catalyst is completely warmed up, a predetermined time (approximately 20 seconds to approximately 30 seconds) after the restart of the engine, or the like.

Effects of Present Embodiment

The following effects can be obtained in the present embodiment.

As described above, in the present embodiment, the intake manifold 3 is provided with the air intake apparatus main body portion 32, the port portion 33 provided integrally with the downstream side end portion of the air intake apparatus main body portion 32, and the heater 37. The injector 31 is disposed at a position where the fuel F can be injected into the heater 37. As a result, it is possible to prevent the fuel F from intruding between at least the air intake apparatus main body portion 32 and the port portion 33 by integrally providing the air intake apparatus main body portion 32 and the port portion 33, and thus it is possible to make it difficult for the fuel F that has been injected from the injector 31 and adhered to the inner surface 3a of the intake manifold 3 to intrude between the air intake apparatus main body portion 32 and the cylinder head 2. In addition, the fuel F that has adhered without vaporization to the inner surface 3a of the intake manifold 3 can be vaporized by the heater 37. As a result, the vaporization of the fuel F by the heater 37 can be promoted and sealability can be ensured with respect to the fuel F injected from the injector 31.

In addition, in the present embodiment, the heater 37 is disposed at the part of the port portion 33 corresponding to the injection region 6 of the fuel F injected from the injector 31 as described above. As a result, the fuel F that has adhered to the inner surface 3a of the intake manifold 3 can be reliably vaporized by the heater 37 being disposed at the part of the port portion 33 that corresponds to the injection region 6 of the fuel F. As a result, in the engine E, the air-fuel ratio in the combustion chamber 22 can be stabilized, and thus the inside of the combustion chamber 22 is capable of being in an ideal combustion state and unburned exhaust gas can be reduced.

In addition, in the present embodiment, the heater 37 is provided on the inner surface 33a side of the port portion 33 as described above. As a result, the heater 37 can be provided at a position closer to the inner surface 3a of the intake manifold 3 to which the fuel F adheres, and thus the fuel F that has adhered to the inner surface 3a of the intake manifold 3 can be sufficiently heated. As a result, the fuel F that has adhered to the inner surface 3a of the intake manifold 3 can be reliably vaporized.

In addition, in the present embodiment, the air intake apparatus main body portion 32 is provided with the flange portion 32b provided integrally with the end portion of the port portion 33 that is on the air intake apparatus main body portion 32 side as described above. The intake manifold 3 is provided with the gasket 34. As a result, the gasket 34 may be disposed only between the flange portion 32b of the air intake apparatus main body portion 32 and the outer surface 2a of the cylinder head 2 unlike in a case where the air intake apparatus main body portion and the port portion are separate bodies and each of the air intake apparatus main body portion and the port portion is provided with the flange portion, and thus the number of the gaskets 34 that are necessary can be reduced. In addition, it is possible to suppress the fuel F intruding from the part between the port portion 33 and the flange portion 32b by integrally providing the flange portion 32b and the end portion of the port portion 33 that is on the air intake apparatus main body portion 32 side, and thus the amount by which the fuel F adheres to the gasket 34 can be reduced.

In addition, in the present embodiment, the gasket 34 is formed in a circumferential shape as described above. As a result, the opening 23 in the upstream side end portion of the air intake port 21 in the intake flow direction A can be surrounded by the gasket 34, and thus foreign matter intrusion into the air intake port 21 can be suppressed.

In addition, in the present embodiment, the distal end portion 31a of the injector 31 is disposed upstream of the boundary part D between the air intake apparatus main body portion 32 and the port portion 33 in the intake flow direction A as described above. As a result, a sufficient distance can be ensured between the distal end portion 31a of the injector 31 and the combustion chamber 22, and thus the time for the fuel F injected from the injector 31 to flow into the combustion chamber 22 can be sufficiently ensured.

As a result, the vaporization of the fuel F injected from the injector 31 can be further promoted. In addition, since a sufficient distance can be ensured between the distal end portion 31a of the injector 31 and the combustion chamber 22, it is possible to suppress dirt adhesion to the injector 31 attributable to a backflow of the high-temperature gas in the combustion chamber 22 to the air intake port 21.

In addition, in the present embodiment, the air intake apparatus main body portion 32 is provided with the injector 31 as described above. As a result, the part where the fuel F injected from the injector 31 hits the inner surface 3a of the intake manifold 3 can be provided on the upstream side in the intake flow direction A as compared with a case where the cylinder head 2 is provided with the injector 31. At this time, the heater 37 heating the fuel F introduced by the injector 31 is provided on the upstream side in the intake flow direction A in accordance with the position of disposition of the injector 31. Accordingly, the port portion 33 can be disposed at the upstream side part of the air intake port 21 in the intake flow direction A in accordance with the positions of disposition of the injector 31 and the heater 37, and thus it is possible to reduce the amount of insertion of the port portion 33 into the air intake port 21. Here, it is possible to suppress heat transfer from the cylinder head 2 to the air K in the air intake passage 35 at the part of the air intake port 21 where the port portion 33 is inserted by inserting the port portion 33 into the air intake port 21. As a result, it is possible to suppress a change in the structure of the cylinder head 2 entailed by the insertion of the port portion 33 into the air intake port 21 (such as a change in water jacket disposition) and a rise in the temperature of the air K in the air intake passage 35 can be suppressed.

In addition, in the present embodiment, the air intake apparatus main body portion 32 is provided with the injector 31 as described above. As a result, it is possible not to provide the cylinder head 2 with a through hole for attaching the injector 31 unlike in a case where the cylinder head 2 is provided with the injector 31. As a result, the cylinder head 2 can be reduced in size to the extent that the through hole is not provided.

Modification Examples

The embodiment disclosed this time is illustrative and non-restrictive in all respects. The scope disclosed here is indicated not by the description of the embodiment but by the claims and includes every modification (modification example) within the meanings and the scopes that are equivalent to the claims.

For example, although the heater protection film 39 is a resin film in the embodiment described above, the present invention is not limited thereto. For example, the heater protection film may be made of another material insofar as the material has heat resistance, oil resistance, and chemical resistance. The heater protection film may be configured by the heater being enclosed by the port portion and may be a metal tape.

In addition, although the port portion 33 is formed by the polyamide 6 in the embodiment described above, the present invention is not limited thereto. In the present invention, the port portion may be made of another material insofar as the material is a heat-resistant material.

In addition, although the heater protection film 39 is, for example, a thin resin film having a thickness of approximately 0.125 [mm] in the embodiment described above, the present invention is not limited thereto. For example, the thickness of the heater protection film may be different from approximately 0.125 [mm].

In addition, although the heat insulating member 38 is formed by foam molding being performed on a polyamide in the embodiment described above, the present invention is not limited thereto. For example, the heat insulating member may have high heat insulating properties and may be glass, melanin foam, Gore-Tex, cellulose, a special fiber, a plated resin material, or the like.

In addition, although the heater 37 has, for example, carbon graphite or a carbon nanotube as a heat generating element having carbon as a main component in the embodiment described above, the present invention is not limited thereto. In the present invention, the heater may be a ceramic heater, a silicone rubber heater, a stainless steel heater, or the like.

Figure 10:
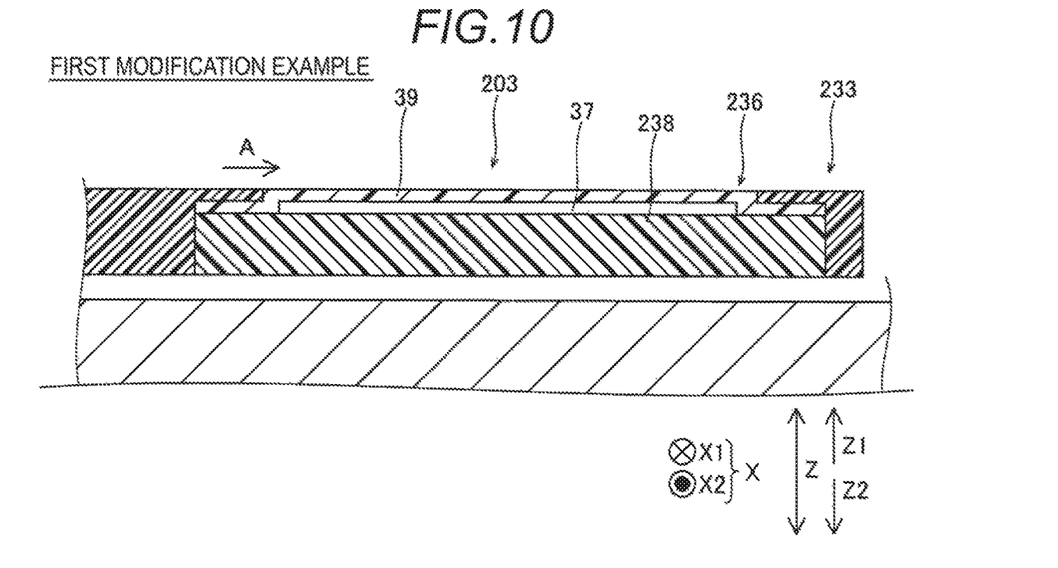
FIG. 10 is a cross-sectional view of a port portion according to a first modification example of the present embodiment and corresponds to a cross-sectional view taken along line X-X in FIG. 5.
Figure 11:
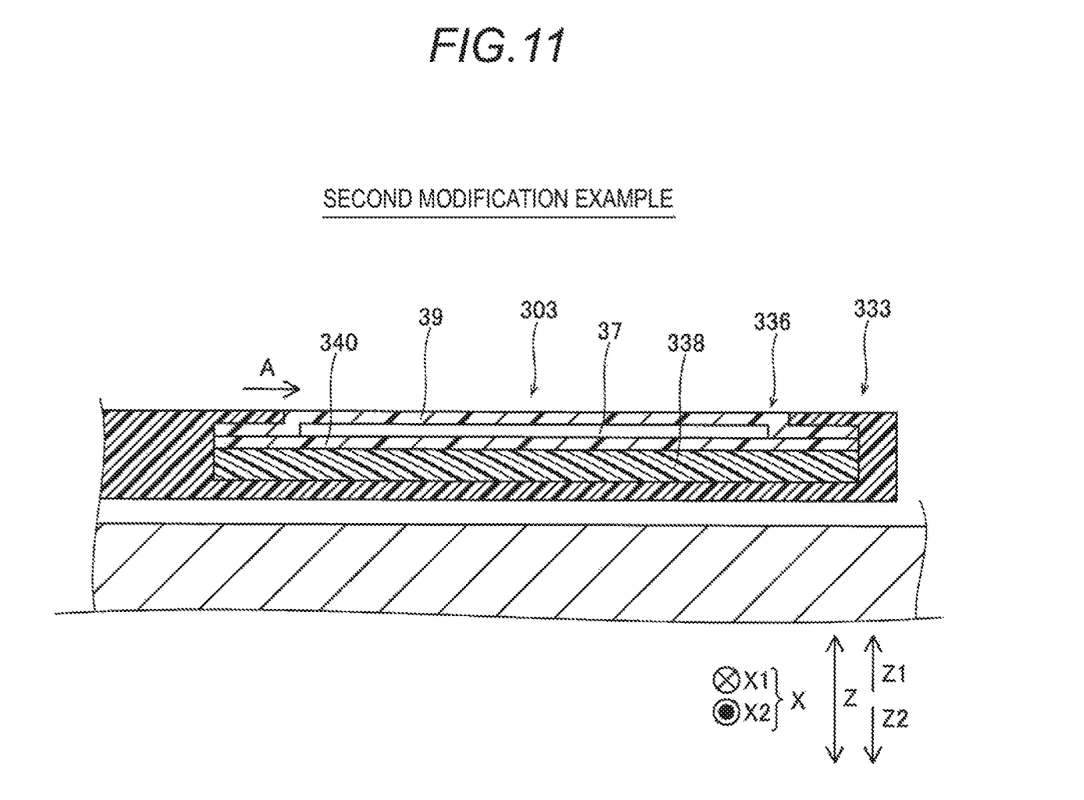
FIG. 11 is a cross-sectional view of a port portion according to a second modification example of the present embodiment and corresponds to a cross-sectional view taken along line XI-XI in FIG. 5.

In addition, although a four-layer structure constitutes the internal structure of the embedded recessed portion 36 part of the intake manifold 3 in the embodiment described above, the present invention is not limited thereto. For example, a three-layer structure may constitute the internal structure of the part of an embedded recessed portion 236 of an intake manifold 203 as in a first modification example illustrated in FIG. 10. In other words, not the embedded recessed portion but the through hole 236 penetrating a port portion 233 may be formed in the port portion 233 and a configuration in which each of the heater protection film 39, the heater 37, and a heat insulating member 238 is stacked in a surface contact state may be embedded in the through hole 236. In addition, a five-layer structure may constitute the internal structure of the embedded recessed portion part of an intake manifold 303 as in a second modification example illustrated in FIG. 11. In other words, each of the heater protection film 39, the heater 37, a heater protection film 340, a heat insulating member 338, and a port portion 333 may be stacked in a surface contact state in an embedded recessed portion 336 of the port portion 333.

In addition, although the control portion 8 is constituted by the ECU including the memory and the CPU in the embodiment described above, the present invention is not limited thereto. For example, the control portion may be a dedicated control circuit controlling the temperature of the heater other than the ECU.

In addition, although the control processing of the control portion 8 has been described with a flow-driven flowchart in which the processing is performed in order along the processing flow for convenience of description in the embodiment described above, the present invention is not limited thereto. In the present invention, the control processing of the control portion may be performed by event-driven processing in which the processing is executed by event. In this case, the processing may be performed by complete event-driven processing or by a combination of event-driven processing and flow-driven processing.

In addition, although the projecting distal end portion of the port portion 33 is disposed at the upstream side part of the reduced portion 21c of the air intake port 21 in the intake flow direction A in the embodiment described above, the present invention is not limited thereto. In the present invention, the projecting distal end portion of the port portion may be disposed downstream of the middle position of the air intake port in the intake flow direction and the projecting distal end portion of the port portion may be disposed upstream of the middle position of the air intake port.

In addition, although the heater 37 is provided on the inner surface 33a side of the port portion 33 in the embodiment described above, the present invention is not limited thereto. In the present invention, the heater may be provided across the inner surface side of the port portion and the inner surface side of the air intake apparatus main body portion.

In addition, although the heater 37 is provided in the port portion 33 in the embodiment described above, the present invention is not limited thereto. In the present invention, the heater may be provided across the port portion and the downstream side end portion of the air intake apparatus main body portion in the intake flow direction.

In addition, although a part of the boundary part D is disposed outside the outer surface of the cylinder block 1 in the Y direction in the embodiment described above, the present invention is not limited thereto. For example, the entire boundary part may be disposed inside the outer surface of the cylinder block in the Y direction.

In addition, although the upstream side end portion of the port portion 33 and the downstream side end of the air intake apparatus main body portion 32 are integrally provided over the entire circumferential direction around the central axis line that extends in the intake flow direction A in the embodiment described above, the present invention is not limited thereto. For example, a part of the upstream side end portion of the port portion and a part of the downstream side end portion of the air intake apparatus main body portion may be integrally provided so as to correspond to the heater disposition part around the central axis line that extends in the intake flow direction.

In addition, although the layered structure formed by the heater protection film 39, the heater 37, the heat insulating member 38, and the intake manifold 3 is formed at a part of the intake manifold 3 in the embodiment described above, the present invention is not limited thereto. For example, a layered structure formed by the heater protection film, the heater, and the intake manifold may be formed at a part of the intake manifold.

In addition, although the predetermined angle θ of the injector 31 is an angle at which a part of the heater 37 can be disposed and a part of the air intake port 24 can be disposed within the range of the downstream end of the injection region 6 in the embodiment described above, the present invention is not limited thereto. For example, the predetermined angle of the injector may be an angle at which only a part of the heater can be disposed within the range of the downstream end of the injection region.

In addition, although the heater 37 is provided in the vicinity of the distal end portion of the intake manifold 3 in the embodiment described above, the present invention is not limited thereto. For example, the heater may be provided upstream of the vicinity of the distal end portion of the intake manifold in the intake flow direction.

An air intake apparatus for an internal combustion engine according to an aspect of this disclosure includes an air intake apparatus main body portion introducing air into a cylinder, a port portion provided integrally with a downstream side end portion of the air intake apparatus main body portion and inserted into an air intake port in a cylinder head, an air intake passage formed inside the air intake apparatus main body portion and the port portion, and through which an air-fuel mixture containing air and fuel flows, an injector provided in the air intake apparatus main body portion and introducing fuel into the air intake passage, and a heater heating the fuel introduced by the injector. The injector is disposed at a position where the fuel is capable of being injected into the heater.

In the air intake apparatus for an internal combustion engine according to the aspect of this disclosure, the air intake apparatus main body portion, the port portion provided integrally with the downstream side end portion of the air intake apparatus main body portion, and the heater are provided as described above. The injector is disposed at a position where the fuel can be injected into the heater. As a result, it is possible to prevent the fuel from intruding between at least the air intake apparatus main body and the port portion by integrally providing the air intake apparatus main body portion and the port portion, and thus it is possible to make it difficult for the fuel that has been injected from the injector and adhered to the inner surface of the air intake apparatus to intrude between the air intake apparatus main body portion and the cylinder head. In addition, the fuel that has adhered without vaporization to the inner surface of the air intake apparatus can be vaporized by the heater. As a result, the vaporization of the fuel by the heater can be promoted and sealability can be ensured with respect to the fuel injected from the injector.

In the air intake apparatus for an internal combustion engine according to the aspect described above, it is preferable that at least a part of the heater is disposed at a part of the port portion corresponding to an injection region of the fuel injected from the injector.

With this configuration, the fuel that has adhered to the inner surface of the air intake apparatus can be reliably vaporized by at least a part of the heater being disposed at the part of the port portion that corresponds to the injection region of the fuel. As a result, in the internal combustion engine, the air-fuel ratio in a combustion chamber can be stabilized, and thus the inside of the combustion chamber is capable of being in an ideal combustion state and unburned exhaust gas can be reduced.

In the air intake apparatus for an internal combustion engine according to the aspect described above, it is preferable that at least a part of the heater is provided on an inner surface side of the port portion.

With this configuration, the heater can be provided at a position closer to the inner surface of the air intake apparatus to which the fuel adheres, and thus the fuel that has adhered to the inner surface of the air intake apparatus can be sufficiently heated. As a result, the fuel that has adhered to the inner surface of the air intake apparatus can be reliably vaporized.

In the air intake apparatus for an internal combustion engine according to the aspect described above, it is preferable that the air intake apparatus main body portion includes a flange portion disposed so as to face an outer surface of the cylinder head around an opening in an upstream side end portion of the air intake port and provided integrally with an end portion of the port portion on the air intake apparatus main body portion side, and the air intake apparatus further includes a seal member disposed between the flange portion and the outer surface of the cylinder head.

With this configuration, the seal member may be disposed only between the flange portion of the air intake apparatus main body portion and the outer surface of the cylinder head unlike in a case where the air intake apparatus main body portion and the port portion are separate bodies and each of the air intake apparatus main body portion and the port portion is provided with the flange portion, and thus the number of the seal members that are necessary can be reduced. In addition, it is possible to suppress the fuel intruding from the part between the port portion and the flange portion by integrally providing the flange portion and the end portion of the port portion that is on the air intake apparatus main body portion side, and thus the amount by which the fuel adheres to the seal member can be reduced.

In this case, it is preferable that the seal member is formed in a circumferential shape.

With this configuration, the opening in the upstream side end portion of the air intake port in an intake flow direction can be surrounded by the seal member, and thus foreign matter intrusion into the air intake port can be suppressed.

In the air intake apparatus for an internal combustion engine according to the aspect described above, it is preferable that a distal end portion of the injector is disposed upstream of a boundary part between the air intake apparatus main body portion and the port portion in an intake flow direction.

With this configuration, a sufficient distance can be ensured between the distal end portion of the injector and the combustion chamber, and thus the time for the fuel injected from the injector to flow into the combustion chamber can be sufficiently ensured. As a result, the vaporization of the fuel injected from the injector can be further promoted. In addition, since a sufficient distance can be ensured between the distal end portion of the injector and the combustion chamber, it is possible to suppress dirt adhesion to the injector attributable to a backflow of the high-temperature gas in the combustion chamber to the air intake port.

The following configuration is also conceivable in the air intake apparatus for an internal combustion engine according to the aspect described above.

APPENDIX 1

The air intake apparatus for an internal combustion engine according to the aspect described above further includes a recessed portion recessed outward in a direction orthogonal to the intake flow direction in at least an inner surface of the port portion and the heater is disposed in the recessed portion.

With this configuration, the intake air that flows through the air intake passage does not directly hit the heater by the heater being disposed in the recessed portion of the port portion, and thus a decline in heater temperature attributable to the intake air that flows through the air intake passage can be suppressed.

APPENDIX 2

In the recessed portion, a heat insulating member is disposed at an outer side and the heater is stacked inside the heat insulating member in the direction orthogonal to the intake flow direction.

With this configuration, the heat insulating member is capable of suppressing transfer of the heat generated in the heater to the port portion during the heating of the heater, and thus it is possible to suppress escaping of the heat of the heater to a place other than a desired heating location. As a result, the heat generated in the heater can be efficiently and easily transmitted to the fuel that has adhered to the inner surface of the air intake apparatus, and thus the fuel can be efficiently vaporized.

APPENDIX 3

In the air intake apparatus for an internal combustion engine according to the aspect described above, the air intake apparatus main body portion and the port portion are provided at each of a plurality of the air intake ports respectively supplying the air-fuel mixture to a plurality of the cylinders in the internal combustion engine.

With this configuration, the vaporization of the fuel by the heater can be promoted in each cylinder and sealability can be ensured with respect to the fuel injected from the injector even in the case of a multi-cylinder internal combustion engine.

APPENDIX 4

In the air intake apparatus for an internal combustion engine according to the aspect described above, an air insulation layer is provided between an outer surface of the port portion and an inner surface of the air intake port in a direction orthogonal to the intake flow direction.

With this configuration, it is possible to suppress heat transfer from the cylinder head to the port portion even when the temperature of the cylinder head has risen to a high temperature, and thus it is possible to suppress a rise in the temperature of the intake air in the air intake passage.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An air intake apparatus for an internal combustion engine, the air intake apparatus comprising:
   an air intake apparatus main body portion introducing air into a cylinder;
   a port portion provided integrally with a downstream side end portion of the air intake apparatus main body portion and inserted into an air intake port in a cylinder head such that an outer perimeter surface of the port portion, which faces outside of the port portion, is surrounded by an air insulation layer which separates the outer perimeter surface of the port portion from an inner perimeter surface of the air intake port, the inner perimeter surface of the air intake port facing the outer perimeter surface of the port portion;
   an air intake passage formed inside the air intake apparatus main body portion and the port portion, and through which an air-fuel mixture containing air and fuel flows;
   an injector provided in the air intake apparatus main body portion and introducing the fuel into the air intake passage; and
   a heater heating the fuel introduced by the injector, wherein
   the injector is disposed at a position where the fuel is capable of being injected into the heater.

2. The air intake apparatus for an internal combustion engine according to claim 1, wherein
   at least a part of the heater is disposed at a part of the port portion corresponding to an injection region of the fuel injected from the injector.

3. The air intake apparatus for an internal combustion engine according to claim 1, wherein at least a part of the heater is provided on an inner surface side of the port portion.

4. The air intake apparatus for an internal combustion engine according to claim 1, wherein
the air intake apparatus main body portion includes a flange portion disposed so as to face an outer surface of the cylinder head around an opening in an upstream side end portion of the air intake port and provided integrally with an end portion of the port portion on the air intake apparatus main body portion side, and
the air intake apparatus further comprises a seal member disposed between the flange portion and the outer surface of the cylinder head.

5. The air intake apparatus for an internal combustion engine according to claim 4, wherein
the seal member is formed in a circumferential shape.

6. The air intake apparatus for an internal combustion engine according to claim 1, wherein
a distal end portion of the injector is disposed upstream of a boundary part between the air intake apparatus main body portion and the port portion in an intake flow direction.

7. The air intake apparatus for an internal combustion engine according to claim 1, further comprising
a recessed portion recessed outward in a direction orthogonal to an intake flow direction in at least an inner surface of the port portion, wherein
the heater is disposed in the recessed portion.

8. The air intake apparatus for an internal combustion engine according to claim 7, wherein
in the recessed portion a heat insulating member is disposed at an outer side and the heater is stacked inside the heat insulating member in the direction orthogonal to the intake flow direction.

9. The air intake apparatus for an internal combustion engine according to claim 1, wherein
the air intake apparatus main body portion and the port portion are provided at each of a plurality of the air intake ports respectively supplying the air-fuel mixture to a plurality of the cylinders in the internal combustion engine.

10. The air intake apparatus for an internal combustion engine according to claim 1, further comprising a heater protection film provided along an inner surface of the heater, the heater protection film being a thin resin film.

* * * * *